(12) United States Patent
Hammerschmidt et al.

(10) Patent No.: US 8,087,301 B2
(45) Date of Patent: Jan. 3, 2012

(54) OPTICAL SYSTEMS AND METHODS FOR DETERMINING TIRE CHARACTERISTICS

(75) Inventors: Dirk Hammerschmidt, Villach (AT); Markus Loehndorf, Munich (DE); Terje Kvisteroey, Horten (NO)

(73) Assignee: Infineon Technologies AG, Neubiberg (DE)

( * ) Notice: Subject to any disclaimer, the term of this patent is extended or adjusted under 35 U.S.C. 154(b) by 1119 days.

(21) Appl. No.: 11/859,816

(22) Filed: Sep. 24, 2007

(65) Prior Publication Data

US 2009/0080703 A1    Mar. 26, 2009

(51) Int. Cl.
*G01L 1/24* (2006.01)
*G06K 9/00* (2006.01)

(52) U.S. Cl. .......................... 73/800; 382/141
(58) Field of Classification Search .................. 356/601, 356/611; 382/141, 152, 153; 73/800
See application file for complete search history.

(56) References Cited

U.S. PATENT DOCUMENTS

| | | | |
|---|---|---|---|
| 4,899,218 A | 2/1990 | Waldecker et al. | |
| 5,092,166 A * | 3/1992 | Wada et al. | 73/146 |
| 5,737,383 A * | 4/1998 | Noda et al. | 378/61 |
| 5,892,139 A * | 4/1999 | Miyazaki | 73/9 |
| 6,430,993 B1 * | 8/2002 | Seta | 73/146 |
| 6,615,650 B2 * | 9/2003 | Mahner | 73/146 |
| 6,674,531 B2 * | 1/2004 | Mahner | 356/457 |
| 7,187,437 B2 * | 3/2007 | Shaw et al. | 356/237.2 |
| 7,203,603 B2 * | 4/2007 | Bertrand | 702/41 |
| 7,398,146 B2 * | 7/2008 | Bertrand | 701/80 |
| 7,456,973 B2 * | 11/2008 | Steinbichler et al. | 356/457 |
| 7,502,124 B2 * | 3/2009 | Muhlhoff et al. | 356/601 |
| 2003/0038945 A1 * | 2/2003 | Mahner | 356/457 |
| 2007/0127808 A1 * | 6/2007 | Daniel, Jr. | 382/152 |
| 2008/0147347 A1 * | 6/2008 | Shaw et al. | 702/108 |
| 2009/0080703 A1 * | 3/2009 | Hammerschmidt et al. | 382/104 |
| 2010/0318335 A1 * | 12/2010 | Martin et al. | 703/8 |

FOREIGN PATENT DOCUMENTS

| | | |
|---|---|---|
| DE | 4419584 A1 | 12/1995 |
| DE | 102005016354 A1 | 10/2006 |
| JP | 2005096554 A | 4/2005 |
| JP | 2005238974 A | 9/2005 |
| WO | 0154955 A1 | 8/2001 |
| WO | 2004005052 A2 | 1/2004 |
| WO | 2005050131 A1 | 6/2005 |

\* cited by examiner

*Primary Examiner* — Patrick J Connolly
(74) *Attorney, Agent, or Firm* — Patterson Thuente Christensen Pedersen, P.A.

(57) ABSTRACT

The invention is related to systems and methods for optically measuring conditions and characteristics related to vehicle tires. In one embodiment, a tire monitoring system comprises a grid, a camera, and a processor. The grid can be configured to deform in conjunction with a deformation of the tire. The camera can be mounted optically proximate the grid and configured to acquire an image of the grid. The processor can be in communication with the camera and configured detect the deformation of the tire from the image.

25 Claims, 8 Drawing Sheets

OPTICAL SYSTEMS AND METHODS FOR DETERMINING TIRE CHARACTERISTICS

FIELD OF THE INVENTION

The invention generally relates to intelligent tire systems. More particularly, the invention relates to optically measuring conditions and characteristics related to vehicle tires.

BACKGROUND OF THE INVENTION

The place where a vehicle tire directly interfaces with a road or other driving surface is often referred to as the contact area. The size, shape, and related dynamics of the contact area, or "footprint," of each tire on a vehicle can provide important information about vehicle size and load, tire pressure and characteristics, road surface, operating and driving conditions, and other factors. Accordingly, detecting and monitoring the footprint during vehicle operation can provide valuable information for improving vehicle handling and safety.

In the past, tire footprints have been measured quasi-statically using pressure sensitive devices positioned between the tire and the driving surface. These devices use capacitive or photo/print techniques in order to image the contact area. Specially prepared transparent inserts in the road in conjunction with optical detection methods have also been used. While successful at identifying the footprint, practical use of these methods is limited because they cannot measure the footprint and determine related contact information during real driving conditions.

Other methods that use multiple sensors inside the tire for continuous measurement of the footprint have also been proposed. Here, one potential disadvantage is a more complicated implementation of these sensors and the need for advanced data analysis due to high bandwidth and data rates. Additionally, the overall weight of these sensors is often required to be below five grams in order to fulfill original equipment manufacturer (OEM) requirements, which can limit system design.

SUMMARY OF THE INVENTION

The invention is related to systems and methods for optically measuring conditions and characteristics related to vehicle tires. In one embodiment, a tire monitoring system comprises a grid, a camera, and a processor. The grid can be configured to deform in conjunction with a deformation of the tire. The camera can be mounted optically proximate the grid and configured to acquire an image of the grid. The processor can be in communication with the camera and configured detect the deformation of the tire from the image.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which.

Figure 1:
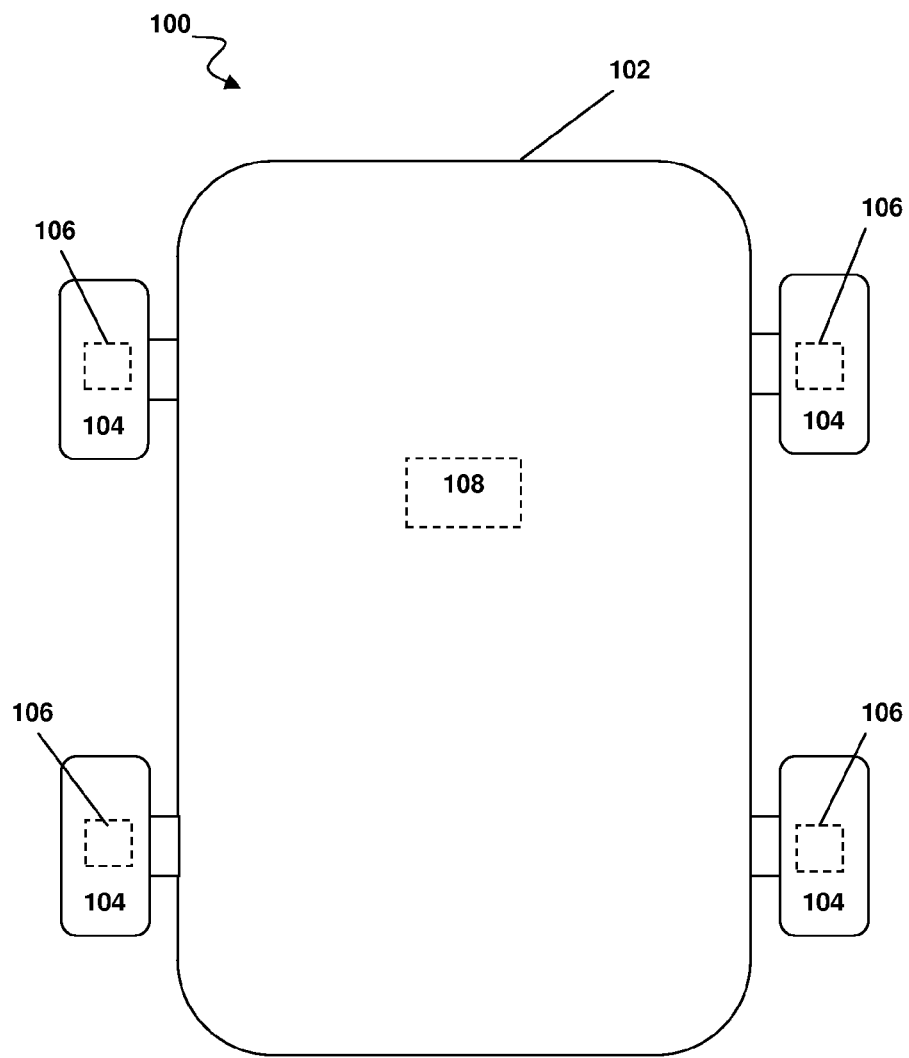
FIG. 1 depicts an intelligent tire system according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to next-generation intelligent tire systems, such as systems and methods for optically measuring and monitoring vehicle tire footprints. Via footprint data, various embodiments of the invention can provide additional information about a tire, its real-time condition, and its interaction with a driving surface, thereby improving vehicle and passenger safety. The invention can be more readily understood by reference to FIGS. 1-10 and the following description. While the invention is not necessarily limited to the specifically depicted application(s), the invention will be better appreciated using a discussion of exemplary embodiments in specific contexts.

Referring to FIG. 1, an intelligent tire system (ITS) 100 according to an embodiment of the invention is depicted. ITS 100 is implemented in a vehicle 102, which can comprise an automobile, SUV, truck, semi-truck, bus, motorcycle, or other vehicle having two, four, or some other number of wheels and tires. As depicted and described in the example that follows, vehicle 102 has four wheels 104 and is but one example of a suitable vehicle for implementing embodiments of ITS 100.

Typically, each wheel 104 comprises a tire including an inner liner that lines the inside of the tire, multiple ply layers over the inner liner, and one or more steel belts over the ply layers. A cushion layer and a base layer are situated over the steel belts and a cap layer, also referred to as the tread layer, is situated on the outside of the tire over the base layer. The tread interacts with the road surface to provide traction. The entire tire structure is then mounted on a rim, forming wheel 104, and coupled to an axle of vehicle 102.

In one embodiment of the invention, each wheel 104 includes an optical detection system 106. In other embodiments, fewer than all wheels 104 comprise optical detection system 106. Optical detection system 106 is in communication with a central control unit 108. In the embodiment depicted, central control unit 108 is mounted in vehicle 102. In other embodiments, central control unit can be external to vehicle 102. In one embodiment, optical detection system 106 and central control unit 108 communicate wirelessly, such as by radio frequency (RF) communications. In alternate embodiments, various other wired and wireless communication methodologies can be used.

Figure 2:
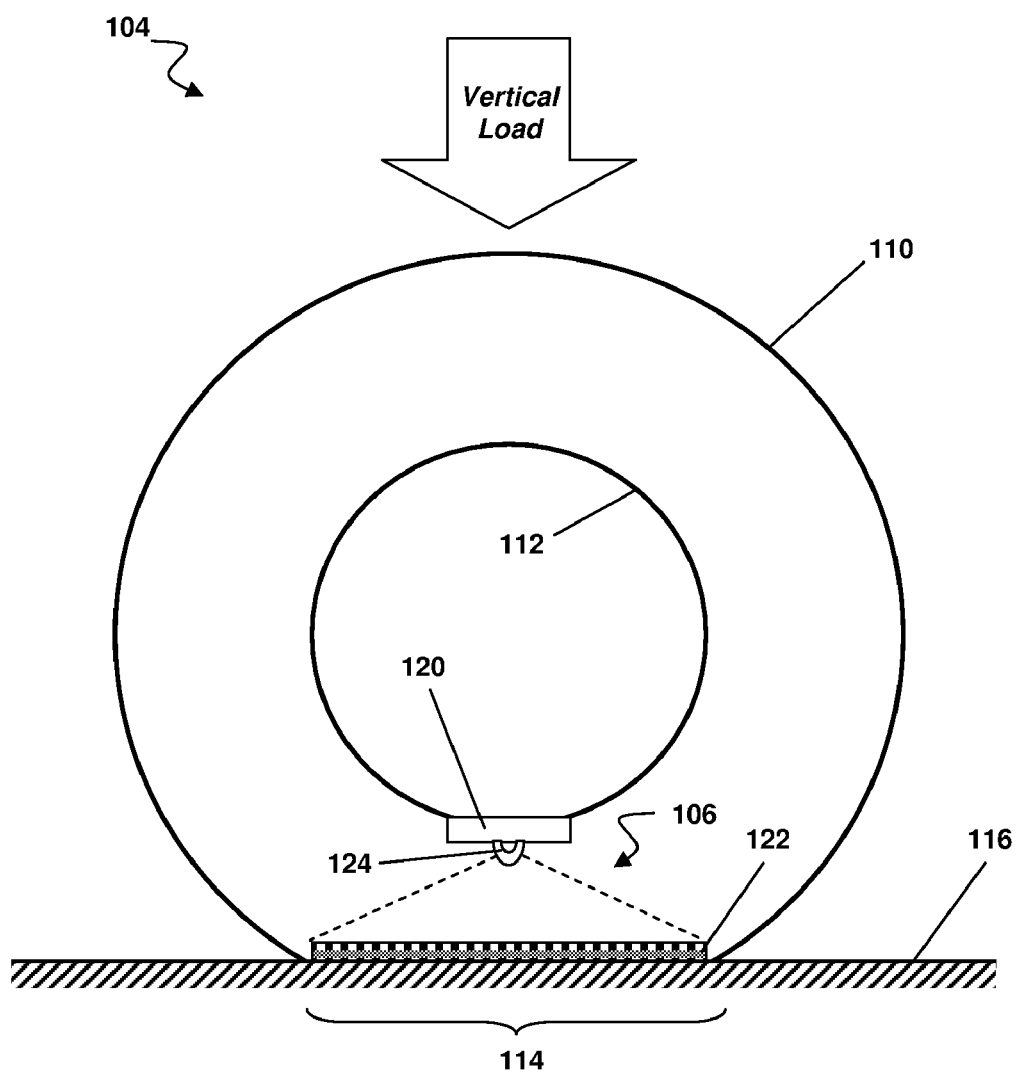
FIG. 2 depicts an optical detection system according to an embodiment of the invention.
Figure 3:
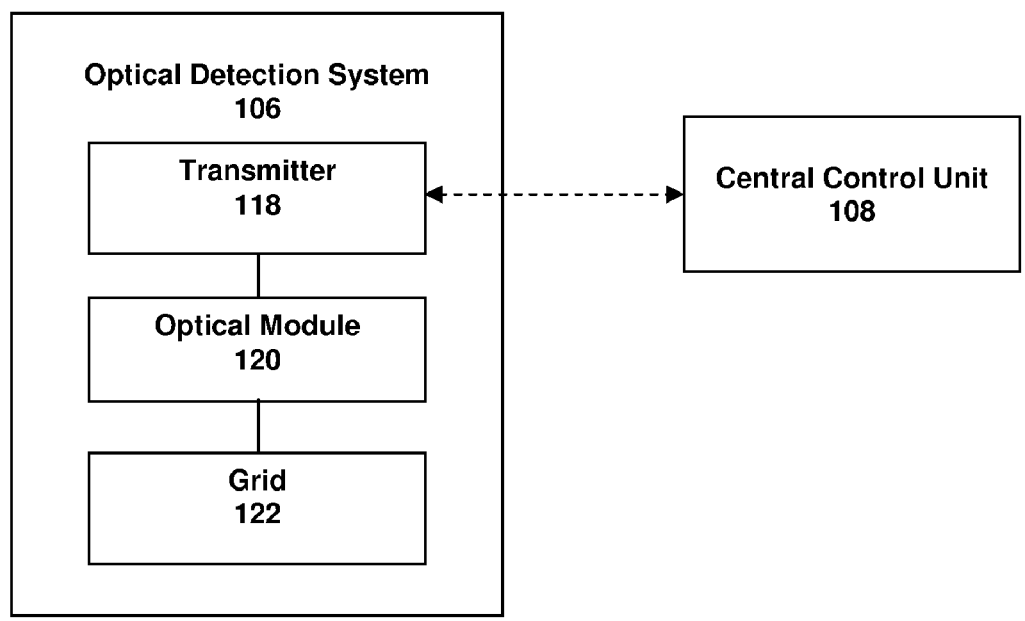
FIG. 3 depicts a block diagram according to an embodiment of the invention.

A wheel 104 and optical detection system 106 according to an embodiment of the invention are depicted in more detail in FIGS. 2 and 3. Wheel 104 comprises a tire 110 mounted on a rim 112. A contact area or footprint 114 is defined where an external tread surface of tire 110 meets a driving surface 116 and deforms due to a vertical vehicle load. The size and shape of footprint 114 can vary during vehicle operation, as described in more detail below.

In one embodiment, optical detection system 106 comprises a transmitter 118, an optical module 120, and a two-dimensional grid 122. Although not depicted, optical detection system 106 can also comprise a microprocessor or microcontroller, power source, and other circuitry, as understood by one skilled in the art. Optical module 120 comprises an optical element 124, such as a camera, and is affixed to rim 112 inside wheel 104. In various embodiments, optical module 120 comprises a standard CMOS or CCD optical system although other systems and components can be used in other embodiments. For example, optical element 124 can comprise a still or video camera or a combination thereof. Optical module 120 can further comprise a light source to illuminate grid 122 and improve image quality.

Grid 122 is affixed opposite optical module 120 at the inner liner of tire 110. In one embodiment, grid 122 comprises a local, lightweight, and substantially flat adhesive patch that rotates within tire 110, moving into and out of footprint 114. Grid 122 is depicted in FIG. 2 as having a more significant vertical (with respect to the orientation of the page) dimension, or thickness, and is depicted in this manner for the purpose of illustration. In another embodiment, grid 122 extends along an inner circumference of tire 110. In yet another embodiment, grid 122 is affixed to an inner sidewall area of tire 110, and optical module 120 is mounted to rim 112 in such a way that an image of grid 122 can be obtained. For example, some or all of optical module 120 can rotate between grids 122 mounted to the inner tread area and the inner sidewall area, or optical module 120 can be mounted to rim 112 angled toward an inner sidewall area. In another embodiment, a plurality of optical modules 120 are mounted within tire 110 to simultaneously image different areas of tire 110.

In use, grid 122 rotates and deforms in conjunction with footprint 114 of tire 110. Deformation of tire 110 in footprint 114 can be related to tire pressure and other conditions, vehicle loading and operation, driving surface and conditions, and other factors. A frequency of deformation can also be used to detect wheel or vehicle speed. Optical module 120 is configured to monitor changes in grid 122 and thereby normal and abnormal deformation of tire 110 at footprint 114. In other embodiments previously mentioned, reflective grid rotates and deforms in conjunction with a sidewall portion of tire 110.

Information related to tire 110 and/or vehicle 102 can be determined from the size, shape, and configuration of an image of grid 122. The optional light source can be operated in a flashing mode synchronous to the acquisition of an image of grid 122 by optical element 124, which minimizes energy consumption. The view angle of optical module 120 relative to grid 122 and the optical resolution are defined such that the complete reflective grid 122 can be resolved and changes related to tire deformation detected. Further, the resolution can be optimized in order to resolve grid 122 and to minimize the amount of data collected, transmitted, and processed and conserve energy. An algorithm can be used by one or both of optical detection system 106 and central control unit 108 to detect changes in grid 122 at certain time intervals. A comparison can be made between a neutral or normal image of grid 122 and an in-motion image of grid 122 in one embodiment. In another embodiment, sequential images of grid 122 can be compared to detect changes. In alternate embodiments, other methodologies are used.

Figure 4A:
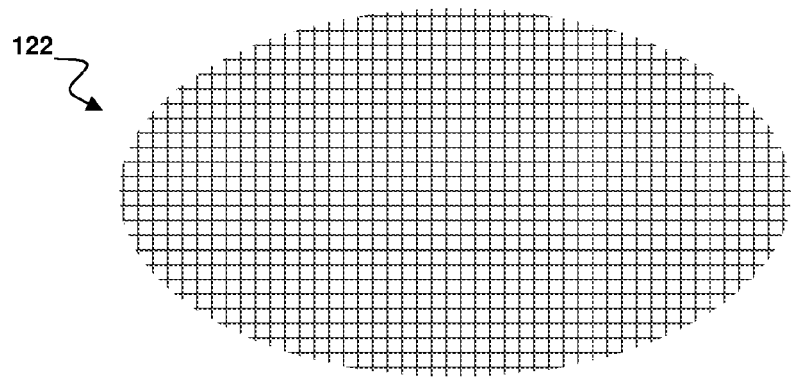
FIG. 4A depicts a two-dimensional grid according to an embodiment of the invention.
Figure 4B:
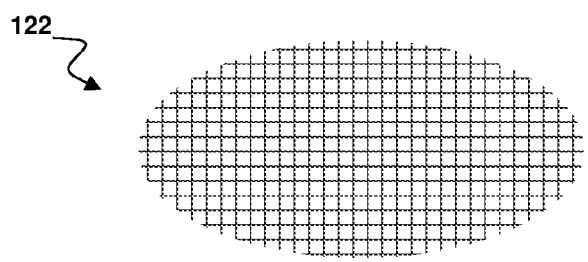
FIG. 4B depicts a two-dimensional grid according to an embodiment of the invention.
Figure 4C:
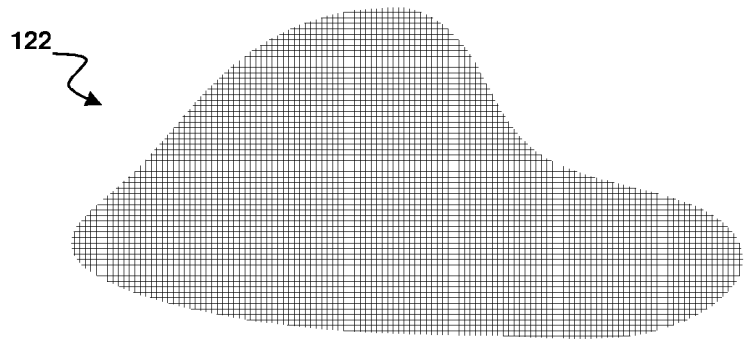
FIG. 4C depicts a two-dimensional grid according to an embodiment of the invention.

For example, a portion of two-dimensional grid 122 as detected by optical module 120 is depicted under various conditions in FIGS. 4A, 4B, and 4C. In FIG. 4A, the detected portion of grid 122 is large and regular. Such a pattern could be imaged by optical module 120 when tire 110 is under a higher vertical load and/or has a lower absolute pressure (e.g. is under-inflated). In FIG. 4B, the imaged portion of grid 122 is small and regular, as could be the case when tire 110 is under a lower vertical load and/or has a higher absolute pressure (e.g. is over-inflated). In FIG. 4C, the detected portion of grid 122 is irregular. Such a pattern could be imaged during turning or other maneuvering of vehicle 102, particularly at a high rate of speed. An irregular pattern could also be imaged if tire 110 has been damaged or permanently deformed.

Figure 5A:
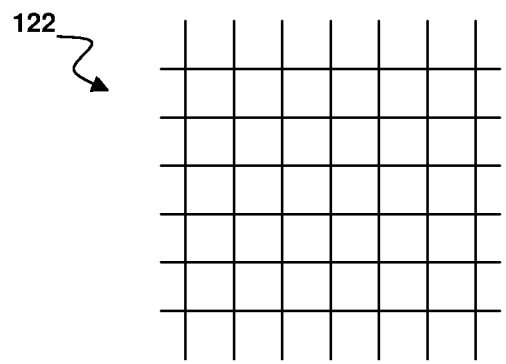
FIG. 5A depicts a two-dimensional grid according to an embodiment of the invention.
Figure 5B:
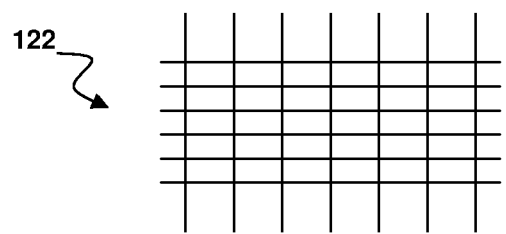
FIG. 5B depicts a two-dimensional grid according to an embodiment of the invention.
Figure 5C:
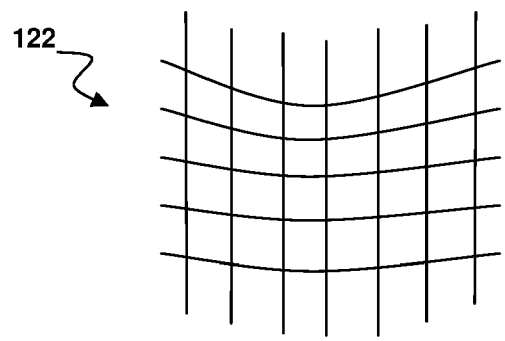
FIG. 5C depicts a two-dimensional grid according to an embodiment of the invention.

In FIGS. 4A-4C and 5A, the two-dimensional pattern within grid 122 is regular. Localized or severe deformation of tire 110, however, can distort the pattern of grid 122 within the overall shape of the detected portion. In FIG. 5B, grid 122 is compressed vertically with respect to the orientation of the page. In FIG. 5C, grid 122 is distorted. In one embodiment, optical detector 120 is further configured to detect such compressions, distortions, and irregularities within the imaged grid 122. Additionally, grid 122 can comprise alternate two dimensional patterns in other embodiments, such as series of dots, checks, stripes, combinations thereof, or other patterns for which optical module 120 is capable of detecting size, shape, deformation, and/or other characteristics.

Figure 6:
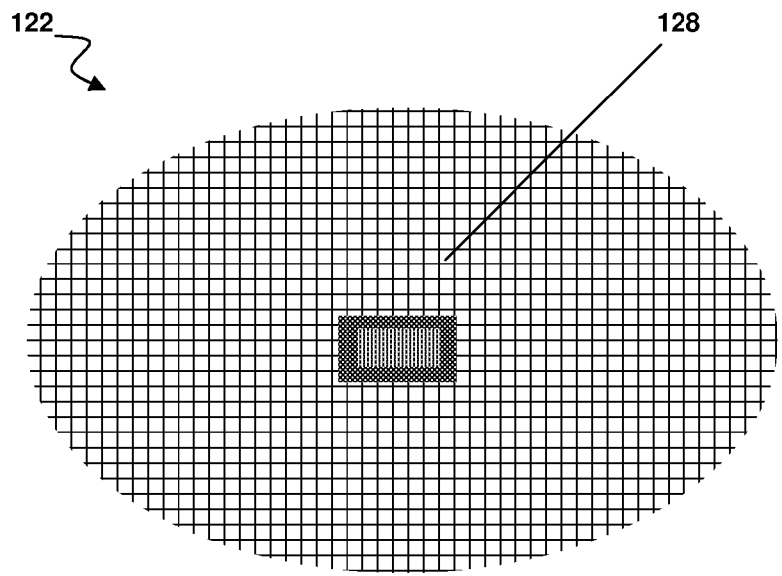
FIG. 6 depicts a reflective grid and bar code according to an embodiment of the invention.

Referring to FIG. 6, grid 122 further comprises a bar code 128 or other identifying mark in one embodiment. Bar code 128 includes information about tire 110, such as make, model, manufacturer, age, or other information, that can be used by optical detection system 106, central control unit 108, vehicle 102, and/or a mechanic or other service provider to obtain information about tire 110. This can be helpful in many situations, such as when new tires are installed on vehicle 102. Bar code 128 can make it easier for optical detection system 106 to determine the type and characteristics of the new tires in order to identify, for example, when a tire does not meet a recommended tire pressure.

Figure 7:
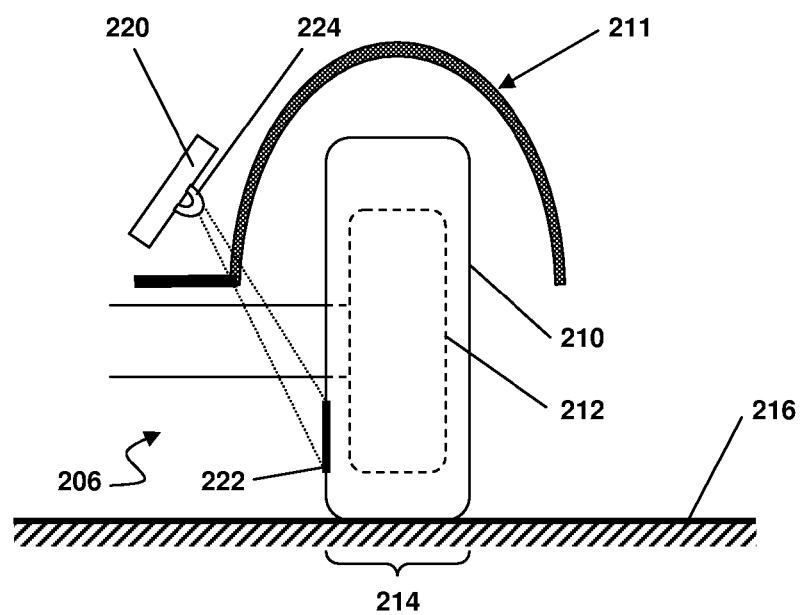
FIG. 7 depicts an optical detection system according to an embodiment of the invention.

FIG. 7 depicts another embodiment of the invention in which an optical module 220 of an optical detection system 206 is mounted outside of a tire 210 and rim 212. In one embodiment, optical module 220 is mounted in a vehicle wheel housing 211. In another embodiment, optical module 220 is mounted in another location proximate but external to tire 210.

In one embodiment, optical module 220 comprises a light source and/or self-cleaning feature (not shown) in addition to optical element 124. A light source can provide additional illumination, thereby improving the image quality obtained by optical element 124 and detector 126. A self-cleaning feature can be useful in maintaining image quality in wheel housing 211, which is exposed to dust, rain, snow, and other dirt and debris.

Two-dimensional grid 222 is mounted to an exterior surface of a tire 210. In the embodiment depicted in FIGS. 7 and 8, grid 222 is a patch mounted to a sidewall surface on an inward side (with respect to a vehicle on which tire 210 is mounted) of tire 210. Grid 222 can comprise a two-dimensional grid, such as is depicted and described herein above with respect to FIGS. 5A-5C. In another embodiment, grid 222 can comprise a solid, non-patterned, or reflective patch, such as a plain white patch easily imaged by optical module 220. As depicted in FIG. 9, grid 222 can also extend about an entire sidewall in other embodiments.

In yet another embodiment, a grid, patch, or other object to be imaged by optical module 220 is projected onto tire 210 by a projection unit (not shown). The projection unit can be a separate module mounted proximate optical module 220 or can be integrated with optical module 220 in various embodiments. In one embodiment, it is advantageous to have the projection unit separate from the camera to avoid imaging of any distortion of the pattern that is projected on the three-dimensional surface of tire 210, which could occur if optical module 220 and the projection unit are integrated and therefore positioned at the same or similar angles to the surface of tire 210. Although it could still be possible to obtain information from density changes related to changing focal sharpness for different transmission lengths and different reflection conditions under different angles and on different surfaces, additional information may be obtainable by separately mounting the projection unit at a different angle to capture a geometric distortion of the projected pattern. In one embodiment, the projection unit can further comprise a self-cleaning function can be beneficial in climates or environments in which keeping grid 222 visible on an exterior surface of tire 210 would be difficult.

Embodiments in which optical detection system 206 is mounted proximate yet external to tire 210 offer several advantages. In these embodiments, optical detection system 206 can comprise wired connections to other vehicle systems and modules. Data rates are therefore not limited by wireless transmission bandwidth to transmit data and information into and out of tire 210. Further, system power consumption need not rely on small and lightweight batteries or energy harvesters and scavengers when more easily accessible in wheel housing 211. Additional information regarding tire status and forces acting on tire 210 can also be obtained from external to tire 210.

Figure 8:
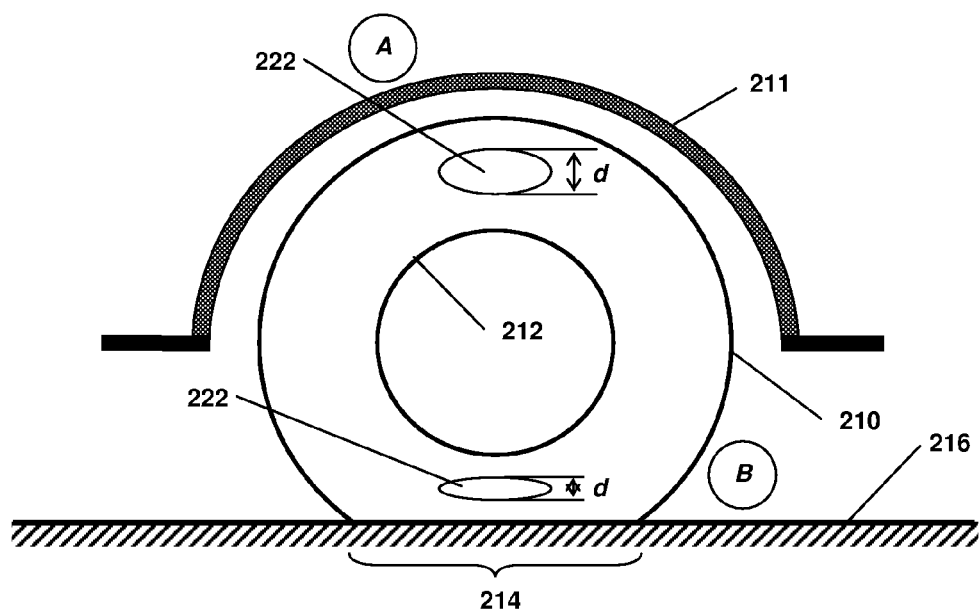
FIG. 8 depicts an optical detection system according to an embodiment of the invention.
Figure 9:
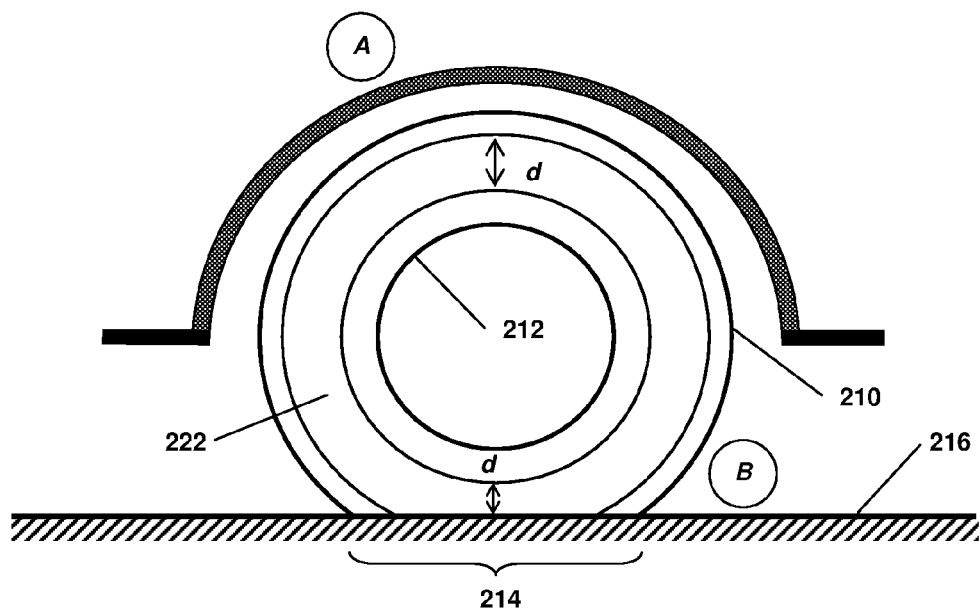
FIG. 9 depicts an optical detection system according to an embodiment of the invention.

Referring to FIGS. 8 and 9, and similar to embodiments previously described, optical module 220 is configured to detect changes in grid 222 or a similar structure related to various forces, moments, tire pressure, vehicle load, material parameters, deformation, and other causes. For example, at A in FIG. 8, grid 222 is uncompressed and has a dimension d. At B, grid 222 is compressed when contacting the driving surface 216 in footprint area 214 of tire 210, altering dimension d. If grid 222 is patterned, the pattern would be compressed or distorted at B relative to position A (refer, for example, to FIGS. 5A-5C). If grid 222 is a solid or reflective patch, the size of the patch would be altered at position B, relative to position A. At A in FIG. 9, circumferential grid 222 has an uncompressed dimension d, while at B dimension d is compressed within the footprint area of tire 210. Additionally, optical module 220 observing position B in FIGS. 8 and 9 can gather additional information about road surface 216, such as surface roughness and wetness, which can be useful for building and analyzing a model of the tire-to-road interface. This can be even more relevant in combination with an embodiment comprising a projection unit as described herein above, as the projected pattern can provide information from dispersion, absorption, and reflectance. Although not depicted, optical module can also be configured to detect centrifugal forces acting on a tire, such as during turning, other maneuvering, and/or frictional interaction with driving surface 216 during motion.

The changes and/or conditions at position B in each of FIGS. 8 and 9 can be detected by optical module 220 and communicated to a central control unit (refer, for example, to FIG. 1). In one embodiment, one or both of optical module 220 and the central control unit calculate various wheel parameters, such as forces, moments, pressure, load, and material parameters previously mentioned, using a model that simulates tire deformation and adapts the parameters to emulate deformation that is observed by the camera of optical module 220. To improve the precision of the model, other known parameters, such as the wheel speed measured by a vehicle ABS system, the acceleration, and the yaw rate of the vehicle, a measured tire pressure such as from a tire pressure monitoring system (TPMS), and temperature can be incorporated. Further, comparisons can also be made between a length of footprint 214 and a deflection of the sidewall. If a disproportion is detected, tire 210 could be experiencing a force orthogonal to a driving direction, such as during a curve. Additionally, tire-to-road interface and other models can also be constructed and analyzed for additional information about tire 210, driving surface 216, and the operation of vehicle 102.

Figure 10:
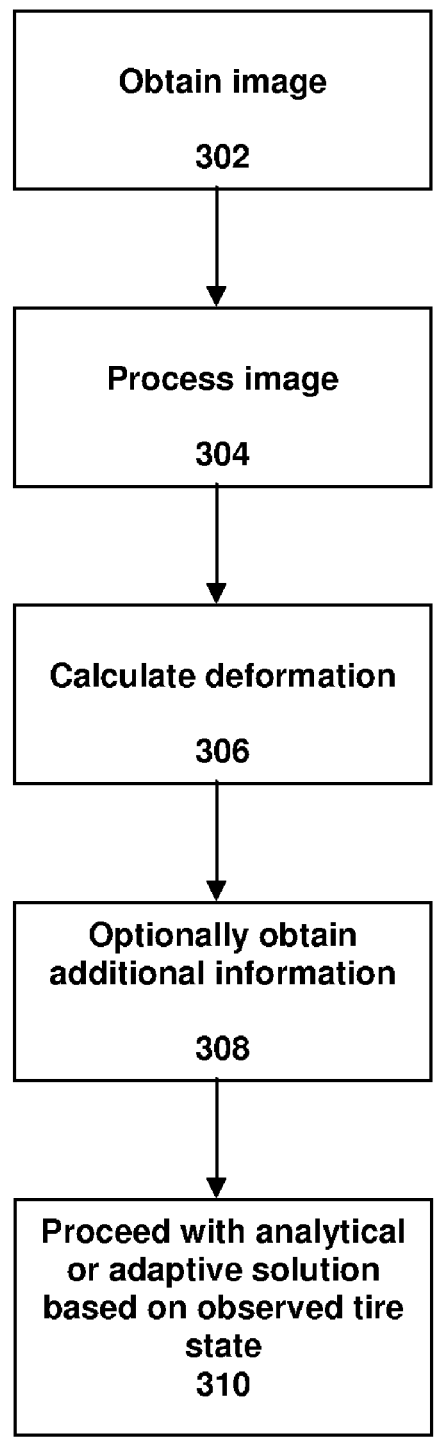
FIG. 10 is a flowchart according to an embodiment of the invention.

FIG. 10 is a block diagram according to an embodiment of the invention. At step 302, an image, series of images, and/or video is obtained. The image is analyzed at step 304, and the shape of the tire and any deformation of the optional pattern calculated at step 306. With the known shape, a model of the tire enables calculation of the actual state of various wheel, tire, and vehicle properties of interest. At step 308, optional information from other sources, such as other vehicle, wheel, and tire sensors including accelerometers, gyroscopes, steering angle sensors, tire pressure and temperature monitoring, wheel speed, and others, can be used to yield more thorough and precise tire modeling. At step 310, a solution can be implemented based on the observed tire state and conditions. For example, if a safety-compromising condition is detected, step 310 can include providing an alert or warning to a driver or operator of the vehicle. If the wheel module or central control unit is in communication with other vehicle and tire systems capable of automatically implementing corrections based on real-time driving conditions, such as braking and traction systems, such corrections or other actions can be taken based on detected conditions.

Embodiments of the invention thus relate to systems and methods for optically measuring and monitoring vehicle tire footprints and other deformation and status data and information. Via such data and information, various embodiments of the invention can provide additional information about a tire, its real-time condition, and its interaction with a driving surface, thereby improving vehicle and passenger safety.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A tire monitoring system comprising:
   a grid mounted to a sidewall surface of a tire and configured to deform in conjunction with a deformation of the tire;
   a camera mounted optically proximate the grid and configured to acquire an image of the grid; and
   a processor in communication with the camera and configured to detect the deformation of the tire from the image.

2. The system of claim 1, wherein the grid comprises a two-dimensional pattern and is coupled to an interior surface of the tire, and wherein the camera is mounted opposite the grid on a rim of the tire.

3. The system of claim 2, wherein the processor is integrated with the camera.

4. The system of claim 1, wherein the image is at least one still image.

5. The system of claim 1, wherein the image is a video image.

6. The system of claim 1, wherein the deformation of the tire comprises a footprint of the tire meeting a driving surface.

7. The system of claim 1, wherein the grid is coupled to an exterior sidewall surface of the tire and the camera is mounted in a wheel housing.

8. The system of claim 7, wherein the grid extends around a sidewall circumference of the tire.

9. The system of claim 7, wherein the grid comprises a solid non-patterned surface.

10. The system of claim 1, wherein the grid further comprises an optically readable tire identifier including information related to the tire.

11. The system of claim 10, wherein the tire identifier comprises a bar code.

12. The system of claim 1, further comprising a light source directed toward the grid.

13. The system of claim 1, further comprising a projector adapted to project the grid onto the sidewall surface of the tire.

14. An optical system comprising:
   a patch affixed to a tire;
   a optical module adapted to obtain an image of the patch;
   a central processing unit communicatively coupled to the camera and at least one vehicle control system, the central processing unit being adapted to determine a status of the tire from the image and information from the at least one vehicle control system; and
   a warning system adapted to convey information related to the status of the tire.

15. The system of claim 14, wherein the at least one vehicle control system comprises a vehicle sensor, a wheel sensor, a tire sensor, an accelerometer, a gyroscope, a steering angle sensor, a pressure sensor, a temperature sensor, or a wheel speed sensor.

16. The system of claim 14, wherein the at least one vehicle control system comprises a braking system or a traction system.

17. The system of claim 14, wherein the patch comprises a two-dimensional grid.

18. The system of claim 17, wherein the patch is affixed to an interior tread surface of the tire and the camera is mounted to a rim.

19. The system of claim 17, wherein the patch is affixed to an exterior sidewall surface of the tire and the camera is mounted exterior to the tire.

20. The system of claim 14, wherein the patch extends about a circumference of a sidewall area of a tire.

21. A method of monitoring a tire comprising the steps of:
   affixing an image target to an external surface of a tire of a vehicle;
   obtaining an image of the image target by a camera mobile with the vehicle;
   analyzing the image to determine a characteristic of the tire; and
   communicating information related to the characteristic of the tire.

22. The method of claim 21, wherein the step of obtaining an image further comprises obtaining a video image of the image target during motion of the vehicle.

23. The method of claim 21, wherein the step of analyzing the image further comprises comparing the image with known characteristics of the tire.

24. The method of claim 21, wherein the step of communicating further comprises providing at least one of an audible alert and a visual alert.

25. The method of claim 21, further comprising mounting the camera to the vehicle external to the tire.

* * * * *